US006285167B1

United States Patent
Jones

(10) Patent No.: US 6,285,167 B1
(45) Date of Patent: Sep. 4, 2001

(54) USE OF CATALYSTS IN STANDBY VALVE-REGULATED LEAD ACID CELLS

(76) Inventor: William E. M. Jones, #A6 Waters Edge, Ocean Hill Boulevard, Freeport (BS)

( * ) Notice: Subject to any disclaimer, the term of this patent is extended or adjusted under 35 U.S.C. 154(b) by 0 days.

(21) Appl. No.: 09/308,041
(22) PCT Filed: Nov. 12, 1997
(86) PCT No.: PCT/US97/20445
   § 371 Date: Jul. 13, 1999
   § 102(e) Date: Jul. 13, 1999
(87) PCT Pub. No.: WO98/21766
   PCT Pub. Date: May 22, 1998

Related U.S. Application Data
(60) Provisional application No. 60/030,854, filed on Nov. 12, 1996.

(51) Int. Cl.[7] ............................................. H02J 7/04
(52) U.S. Cl. ................................. 320/147; 429/58
(58) Field of Search ........................... 320/147, 137, 320/139; 429/57, 58, 59, 61, 62

(56) References Cited

U.S. PATENT DOCUMENTS

| | | | |
|---|---|---|---|
| 3,929,422 | 12/1975 | Kreidl et al. | 422/190 |
| 3,930,890 | 1/1976 | Dietz | 502/152 |
| 4,074,024 | 2/1978 | Reber | 429/86 |
| 4,349,614 | 9/1982 | Werth | 429/50 |
| 4,415,638 | 11/1983 | Meighan et al. | 429/225 |
| 4,584,248 | 4/1986 | Iwata | 429/54 |
| 4,876,495 | 10/1989 | Palanisamy et al. | 320/106 |
| 5,059,495 | 10/1991 | Burmistrov et al. | 429/57 |
| 5,114,806 | 5/1992 | Chiacchio et al. | 429/126 |
| 5,290,640 | * 3/1994 | Tsenter | 429/101 |
| 5,547,783 | 8/1996 | Funato et al. | 429/212 |
| 5,885,727 | * 3/1999 | Kawatsu | 429/17 |
| 6,154,011 | * 11/2000 | Lam et al. | 320/139 |

FOREIGN PATENT DOCUMENTS

| | | |
|---|---|---|
| 29 04 842 | 2/1979 | (DE) . |
| 63231882 | 9/1988 | (EP) . |
| WO 97/15958 | 5/1997 | (WO) . |

OTHER PUBLICATIONS

"Maintenance–Free Batteries Lead–Acid, Nickel/Cadmium, Nickel/Hydride" A Handbook of Battery Technology D. Berndt, pp. 131–133 & 180–183 Copyright 1993.

"Technical trends in industrial lead/acid batteries in Japan" 6040 Journal of Power Sources 48(1994) Feb. 19, Nos. 1/2, Lausanne, CH pp. 55–67.

Behavior of CRLA Cells on Long Term Float: Part 2 pp. 3–10, Oct. 1996.

Correcting Imbalance in VRLA Cells With Catalysts: Draft 2 pp. 1–4, 1997.

(List continued on next page.)

Primary Examiner—Peter S. Wong
Assistant Examiner—Lawrence Luk
(74) Attorney, Agent, or Firm—Synnestvedt & Lechner LLP

(57) ABSTRACT

In the charging of a valve-regulated, lead-acid (VRLA) cell at a charge voltage which has a value that is slightly in excess of the value of the open-circuit voltage of the cell, wherein, during charging of the cell, there is produced at the positive and negative electrodes respectively oxygen gas and hydrogen gas in a predetermined amount, and wherein the negative electrode tends to discharge over a prolonged period of time during charging, the improvement comprising inhibiting the tendency of the negative electrode to discharge during charging by controlling the amount of oxygen gas in the cell by catalytically converting a portion of the oxygen gas and a portion of the predetermined amount of hydrogen gas to water, for example, by use of a catalyst positioned in the cell.

21 Claims, 5 Drawing Sheets

OTHER PUBLICATIONS

Correcting Inherent Imbalance and Consequent Failure of VRLA Cells By The Use of Catalysts—Longe Version 8 pages, 1997.

"Failure mode of the negative plate in recombinant lead/acid batteries" Journal of Power Sources 52 (1994) 201–209 Sven Atlung, Birgit Zachau–Christiansen.

"Noble metal–free catalysts for the hydrogen.oxygen recombination in sealed lead/acid batteries using immobilized electrolytes" Journal of Power Sources 40 (1992) 175–186 H. Dietz, L. Dittmar, D. Ohms, M. Radwan and K. Wiesener.

"Performance Measurement and Reliability of VRLA Batteries" Dr. David O. Feder, 16 pages Oct. 30, 1995.

"Gas Evolution, Dryout, and Lifetime of VRLA Cells—An Attempt to Clarify Fifteen Years of Confusion and Misunderstanding" Dr. David O. Feder & Mr. William E. M. Jones 0–7803–3507–4/96 pp. 184–192.

"On the hydrogen balance in sealed lead/acid batteries and its effect on battery performance" Journal of Power Sources, 42 (1993) 89–101 H. Dietz, M. Radwan. H. Doring and K. Wiesener.

Letter dated Jul. 22, 1998 from Charles N. Quinn of Dan Dorfman Herrell and Skillman attorney for C&D Technologies, Inc. to Philadelphia Scientific Corporation.

* cited by examiner $H_2^*$ IS EQUIVALENT IN IONS.

USE OF CATALYSTS IN STANDBY VALVE-REGULATED LEAD ACID CELLS

CROSS REFERENCE TO RELATED APPLICATION

This application claims the benefit to U.S. Provisional Application No. 60/030,854, filed Nov. 12, 1996.

FIELD OF THE INVENTION

The present invention relates to improving the service life of valve regulated lead acid (VRLA) cells in standby service.

The construction of a VRLA cell is shown schematically in FIG. 1. Like the traditional flooded cell, it has at least two electrodes or plates: a positive plate and a negative plate. Each of these plates is made of a current-collecting grid and an energy-storing active material. The VRLA cell differs, however, from the flooded cell in two ways.

First, the plates, instead of being immersed in a bath of electrolyte, are sandwiched between sponge-like separators which are made usually from absorbent glass fiber. Most of the electrolyte is absorbed in these separators. This type of VRLA cell is called the "absorptive glass mat" type, or AGM cell. Another exemplary type of VRLA cell is the "gel cell" in which liquid electrolyte of the type used in a conventional flooded cell is replaced by a gelled electrolyte. The present invention applies also to this type of VRLA cell. However, for the sake of clarity, the following description will be in terms of the AGM cell only.

A second difference between the VRLA cell and the flooded cell is that the flooded cell is vented to the atmosphere through a simple orifice, whereas the VRLA cell is vented through a one-way valve. The purpose of the one-way valve is to allow gas to escape from the cell to prevent over-pressurizing of the cell and prevent ingress from the air of oxygen that would oxidize and, therefore, discharge the negative plate. (Note that the negative plate of a flooded cell is protected by submersion in the acidic electrolyte, but the negative plate of the VRLA cell is exposed and very vulnerable to free oxygen in the cell).

As in any lead-acid cell on charge, oxygen is produced on the positive plate; some of this oxygen corrodes the positive grid. This is a fundamental characteristic of the lead acid cell and cannot be avoided.

The rate of corrosion of the positive grid is one of the two critical reactions that, in a VRLA cell, must be balanced or compensated for to avoid problems of short service life. This rate depends on the cell design. For example, two thin grids will corrode faster than a single thick grid of the same capacity due to their larger surface area. Different alloys also have differing rates of corrosion.

The negative grid is protected cathodically and does not normally corrode. However, the material comprising the negative electrode plays a major role in the design of the cell because it has an inherent tendency to self-discharge if the cell is left on open circuit. Such discharge is accompanied by the formation of hydrogen. The rate of the self-discharge reaction represents the second critical reaction in a VRLA cell that must be balanced to avoid service problems.

To the battery user, the VRLA cell has important advantages over a conventional flooded cell. One advantage is that the electrolyte, which is immobilized by the glass mat separators, cannot leak out of the cell even if the case or housing is punctured or inverted. Another advantage is that the cell has a reduced water consumption and, therefore, lower associated maintenance costs.

VRLA cells have been very successful in replacing conventional "flooded" cells in many standby applications such as, for example, a source of uninterruptable power supplies in telephone and computer systems. Much of this success is due to the claims by the manufacturers that the VRLA cells will provide a full 20-years of service without requiring water addition of any kind.

There is, however, evidence which has been collected from extensive laboratory testing over a two-year period that indicates that such claims may be overly optimistic. This is especially true at higher operating temperatures such as, for example, 90° F. (32° C.) at which many of the VRLA cells tend to fail in much shorter time periods. This problem is described in more detail below.

First, and by way of background, it is noted that the VRLA cell operates on a well-known principle called the "oxygen cycle" which gives the cell its ability to operate at reduced levels of water consumption. FIG. 1 shows schematically a VRLA cell on charge. The oxygen gas produced by the positive plate, instead of bubbling to the surface of the electrolyte and leaving the cell as it would do in a flooded cell, penetrates the glass mat separator and comes into direct contact with the negative plate. (For example, a major portion of the oxygen gas so produced can migrate from the positive to the negative plate.) The result is the immediate "depolarization" of the negative plate, that is, a reduction in the voltage of the negative plate to approximately its open-circuit value.

This lower voltage causes the negative plate to produce less hydrogen so, in effect, the oxygen cycle suppresses the quantity of hydrogen produced. However, it does not eliminate the production of hydrogen (as may be erroneously believed), but reduces it to the minimum value possible, namely, the open-circuit value, for example, about 20 to about 80 cc/day/100 ampere hours (at 30° C.).

On the negative plate surface, the oxygen recombines with hydrogen ions from the electrolyte (plus the necessary electrons which are not shown for the sake of clarity) to reform water. Thus, the cell has a much reduced level of water consumption.

On the basis of this model, the industry has produced millions of VRLA cell for a multitude of applications. In many of these applications, the cells are operating successfully and are well accepted by their users. Surprisingly, however, in some commercial applications, high quality, heavy duty cells are demonstrating a serious problem of reduced capacity and short life. Such cells include those that have been designed for long-life by equipping them with highly corrosion-resistant positive grids. The extent of the problem is that cells designed for 20 years of service life may fail (defined as 80% or less capacity) in as little as 5 years or even less.

Various battery manufacturers have tended to assign the blame for such failures, including failures which have been observed in the field, to manufacturing defects or customer abuse. Research has shown that there are other reasons for the failures, as the failures have tended to continue.

The present invention relates to improvements in the design of and operation of VRLA cells.

SUMMARY OF THE INVENTION

In accordance with the present invention, there is provided a method for charging a valve-regulated, lead-acid (VRLA) cell at a charge voltage which has a value that is slightly in excess of the value of the open-circuit voltage of the cell, said cell including, in spaced relationship, a positive electrode and a negative electrode, and sandwiched therebetween electrolyte-containing separator means in which electrolyte is contained, wherein, during charging of the cell, there is produced at the positive and negative electrodes respectively oxygen gas and hydrogen gas in a predetermined amount, a portion of the oxygen gas tending to migrate through the electrolyte-containing separator means to the negative electrode and cause depolarization thereof, and wherein there is also formed at the positive electrode hydrogen ions which migrate to the negative electrode to form hydrogen gas in an amount less than said predetermined amount, the negative electrode tending to discharge over a prolonged period of time during charging, the improvement comprising inhibiting the tendency of the negative electrode to discharge during charging by controlling the amount of oxygen gas in the cell by catalytically converting a portion of the oxygen gas and a portion of the predetermined amount of hydrogen gas to water.

In accordance with another aspect of the present invention, there is provided an electrical cell comprising:

(A) a sealed housing;
(B) a positive electrode positioned in the housing;
(C) a negative electrode positioned in the housing in spaced relationship from the positive electrode;
(D) electrolyte-containing separator means positioned between said electrodes and containing electrolyte;
(E) a pressure relief valve which allows gas to escape from the housing and which prevents oxygen gas from outside the housing to contact said negative electrode;
(F) a catalyst positioned in the housing for converting oxygen gas and hydrogen gas which is generated in the housing to water; and
(G) means for charging the cell at a charge voltage having a value which is slightly in excess of the value of the open-circuit voltage of the cell.

The development of the present invention stems from tests which indicate that industrial quality VRLA cells have a general problem in standby float service. The problem is that they lose capacity continuously—even while on charge. Further, the problem is independent of the manufacturer of the cells and of the processes by which the cells are made. As mentioned above, cells that have been designed for twenty years of service life are failing in as few as five years or in even a fewer number of years. It should be appreciated from the following detailed description of the present invention that the present invention provides an improved cell which overcomes the aforementioned type of problems that are associated with the prior art VRLA cells.

DETAILED DESCRIPTION OF THE INVENTION

Figure 1:
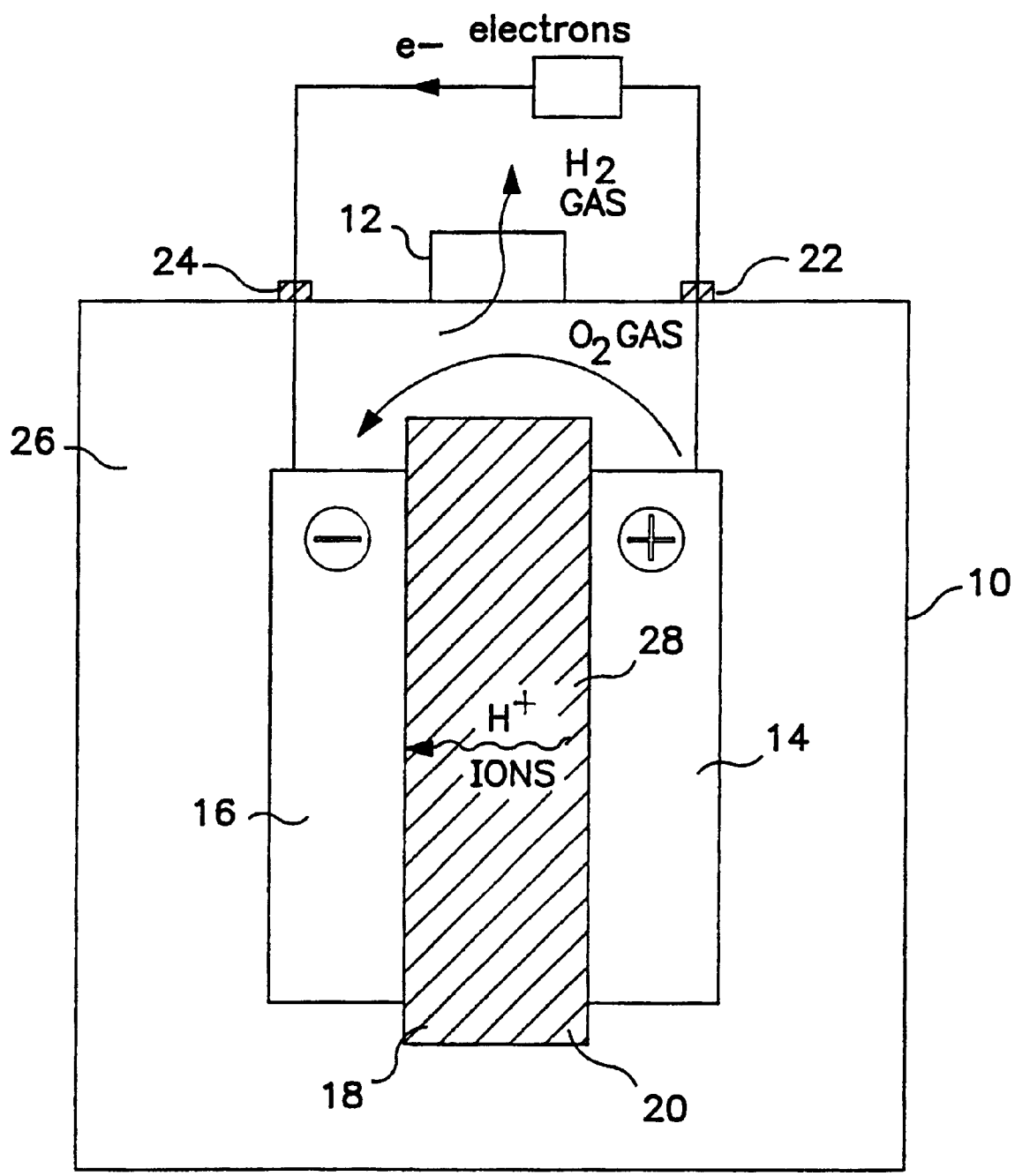
FIG. 1 shows a schematic cross-sectional view of a VRLA cell.

With reference to FIG. 1, the VRLA cell of the present invention has a sealed housing 10 which is provided with a pressure relief (one-way) valve 12. A positive electrode 14 having an active material is positioned within the housing 10. A negative electrode 16 having an active material is also positioned in the housing and in spaced relationship from the positive electrode. Such electrodes are typically in the form of plates. Electrolyte-containing separator means 18 are sandwiched between the positive and the negative electrodes and contained in the separator means is electrolyte 20. Virtually all of the electrolyte is contained in the separator means, there being no "free" electrolyte in the cell.

It is believed that the VRLA cells that will be used most widely will include the following: a positive electrode comprising a conductive material such as a lead alloy, preferably a lead-calcium alloy, and an active material comprising $PbO_2$; a negative electrode comprising lead, preferably finely divided particles of substantially pure lead, referred to in the industry as "sponge lead"; and an electrolyte of dilute sulfuric acid.

The positive and negative electrodes 14 and 16 are connected electrically to positive and negative terminals 22 and 24, typically by straps, as they are commonly referred to in the art.

A gas space 26 in the housing is defined by the inside walls of the housing, the positive and negative electrodes, and the separator means.

The VRLA cell is typically charged on a continuous basis and over a long-term, for example, in excess of five years. The word "continuous" as used herein in connection with the charging of the cell is intended to mean an uninterrupted flow of current, as well as an intermittent flow of current, for example, a pulsating current.

As mentioned above, a VRLA cell in accordance with the present invention is charged at a voltage having a value that is slightly in excess of the value of the open-circuit voltage of the cell which, for example, is typically about 2.15 volts. The term "slightly in excess" means a value no greater than about 0.3 volt above the open circuit voltage of the cell in applications in which there is an intermittent flow of current. In applications in which the flow of current is uninterrupted during charging, it is preferred that the charge voltage have a value that is no greater than about 0.2 volt above the open-circuit voltage of the cell.

In work leading to the development of the present invention, extensive investigations have led to the conclusion that the designs of prior art VRLA cells have produced cells that are electrochemically "out of balance". An explanation follows.

There are two fundamental reactions which govern the production of hydrogen in a VRLA cell. They are: (1) corrosion of the positive grid; and (2) self-discharge of the negative active material. The corrosion of the positive grid produces hydrogen ions 28 which migrate to the negative electrode 16 where they recombine with electrons from the external circuit to form hydrogen gas. The hydrogen gas so formed emanates from the negative electrode 16. Simultaneously, with the production of such hydrogen gas, the negative electrode 16 is also producing hydrogen gas by an independent, self-discharge chemical reaction. To keep the negative electrode charged fully, therefore, there must be formed an amount of hydrogen gas from the ions and electrons that migrate from the positive electrode that is equal to the amount of hydrogen gas that is lost by the self-discharge reaction.

If the aforementioned two reactions produce exactly the same equivalent amount of hydrogen, the cell is in perfect balance, that is, if the hydrogen ions 28 (formed by positive grid corrosion) are capable of forming an amount of hydrogen gas precisely equivalent to the amount of gaseous hydrogen formed by discharge of the negative plate, the cell is balanced.

Inside such a balanced cell, no excess oxygen is generated to cause discharge of the negative electrode 16. The cell will, theoretically, keep its capacity until it dries out or fails from some other normal condition. In that sense, the balanced cell might appear to be the perfect VRLA cell. Such a perfectly balanced cell can be made, but the difficulty is to make a balanced cell that has a long life, for example about 15 to about 20 years.

Consider that the rate of corrosion of the positive grids has to be quite high in order to produce enough hydrogen ions 28 to balance the rather large amount of hydrogen gas leaving the negative electrode. This can be accomplished by making a cell with thin plates which, however, will have a relatively short life. The irony is that, if a deliberate effort is made to improve the life of such a cell by improving the corrosion-resistance of the positive grid, the cell will promptly become unbalanced in a relatively short period of time and the life of that cell will become worse, not better by virtue of the discharge of the negative electrode. The relatively thick positive grids made with a corrosion resistant alloy will produce much less hydrogen than needed to counter normal negative plate discharge.

Cells having relatively high corrosion-resistant positive grid are presently being manufactured and sold. Investigations have shown that one such cell had a measured imbalance of 5:1, that is, the amount of hydrogen formed by hydrogen ions that migrated from the positive electrode was only one fifth the amount required to support the negative at full charge. Other tests have shown such ratios as high as 7:1.

Figure 2:
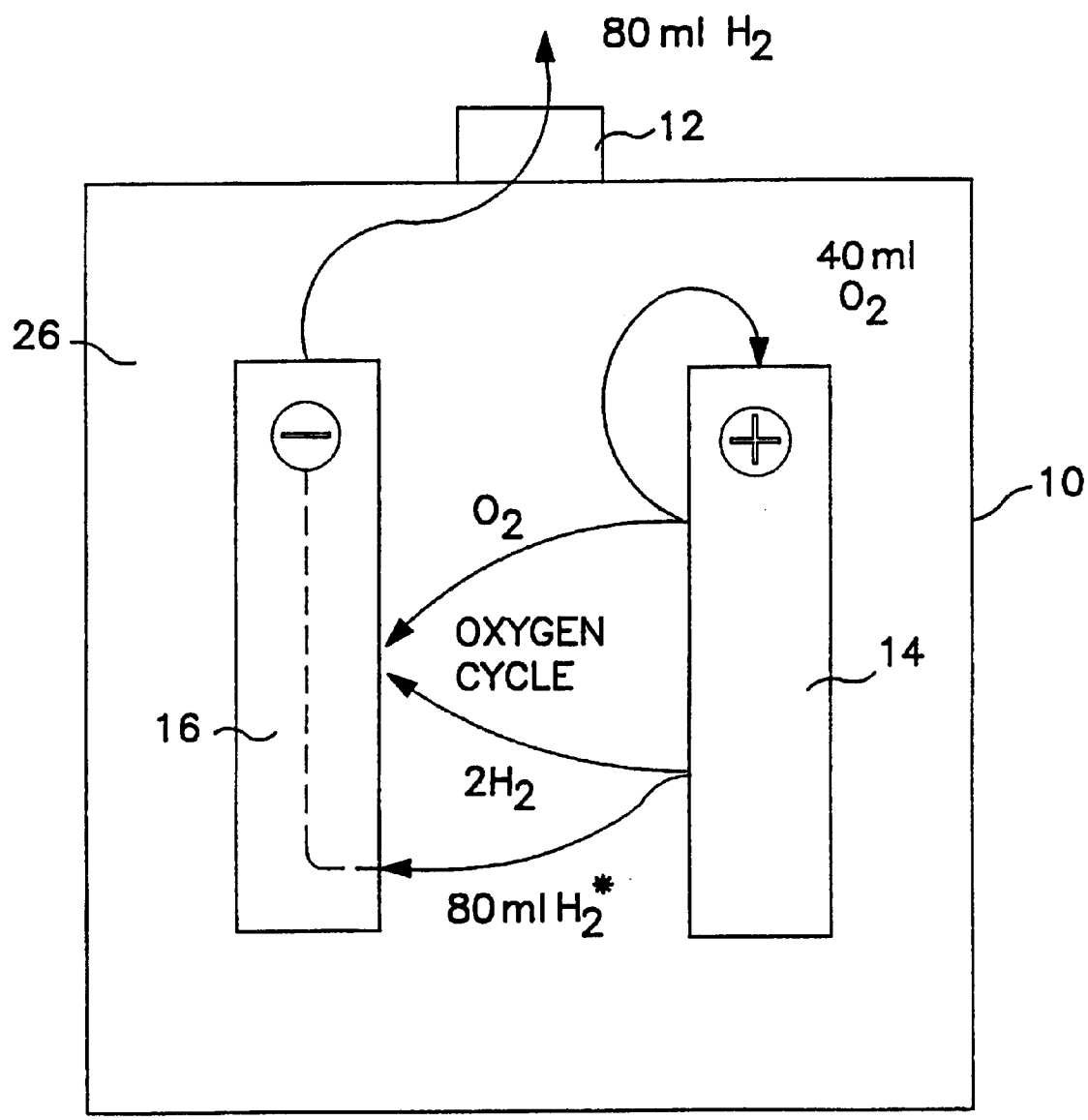
FIG. 2 shows a schematic cross-sectional view of the gas and ion flow in a balanced VRLA cell.

FIG. 2 shows a diagram of the gas and ion flow in a hypothetically balanced VRLA cell with a nominal 100 ampere hour capacity. The amount of hydrogen given off by the negative plate is measured at 80 ml/day. The formation of oxygen production is explained as follows. In FIG. 2, oxygen used up in the corrosion reaction is assumed to be 40 ml per day. Since that oxygen is removed from the water in the cell, the corresponding hydrogen ions which leave the positive plate on route to the negative plate is, therefore, equivalent to 80 ml/day of hydrogen gas. (More precisely, the ions will turn into that amount of gas when they reach the negative plate). This amount of hydrogen gas is equivalent to the amount of hydrogen gas given off by the negative plate. Accordingly, the cell is balanced.

The other reactions marked "oxygen cycle" in FIG. 2 do not produce any excess gases of any kind and so can be ignored in this analysis.

Figure 3:
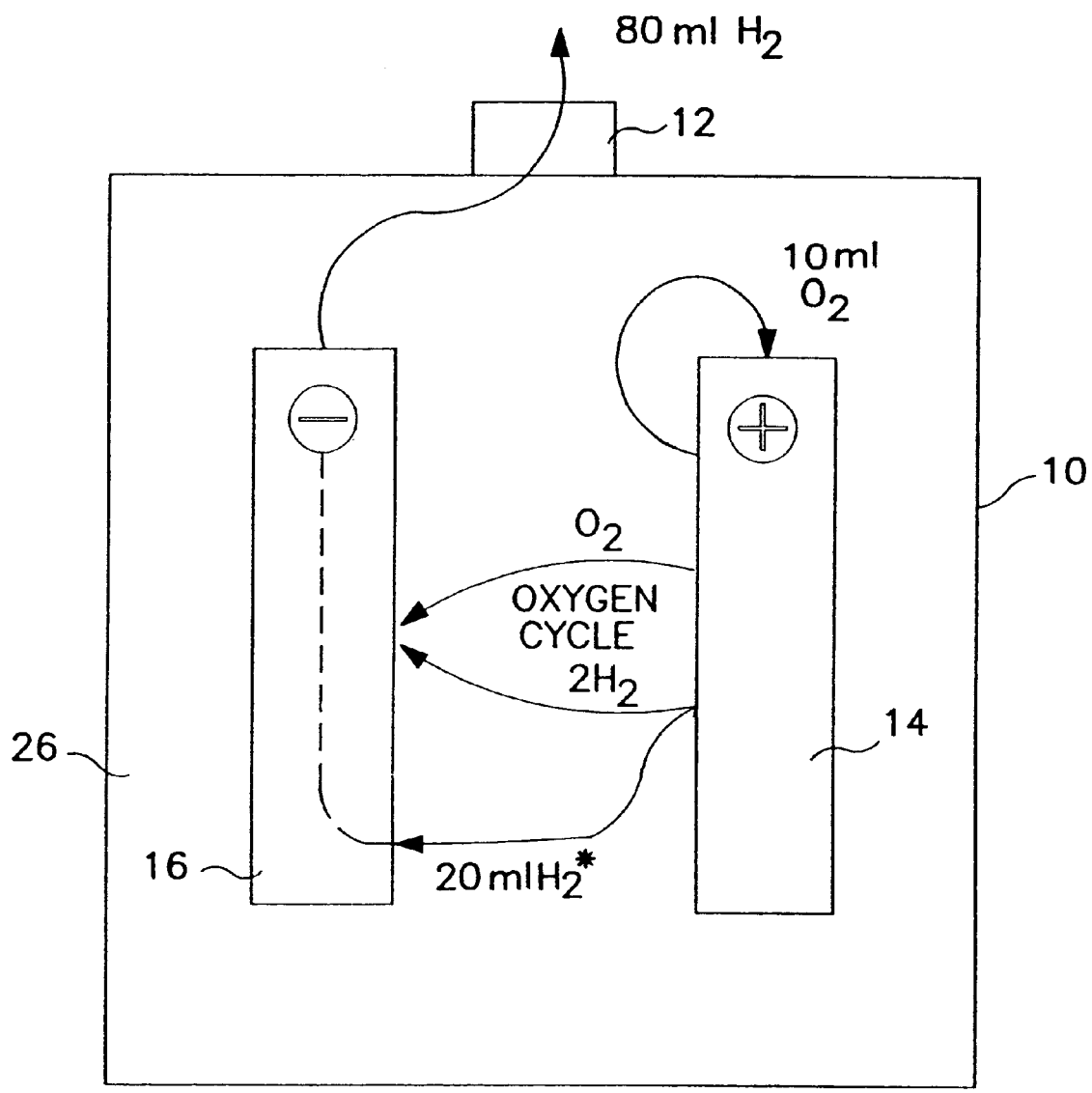
FIG. 3 shows a schematic cross-sectional view of the gas and ion flow in an unbalanced VRLA cell.

FIG. 3 shows a similar flow diagram for an unbalanced cell of the same 100 ampere hour capacity. In this case, the corrosion-resistance of the positive grid is four times better than in the example of FIG. 2, so only 10 ml of oxygen per day are consumed in the reaction. The hydrogen ions left over from the corrosion of the positive grid equates to only 20 ml per day, that is, a quarter of that necessary to provide the 80 ml/day of hydrogen gas emitted from the negative plate. This means that the negative plate will discharge chemically to lead sulfate and water. Not only will the negative plate discharge, but it will discharge quite rapidly—namely, at three quarters of the open-circuit rate. In other words, it will discharge almost as fast as if it were not being charged at all.

Conventional wisdom would indicate that the cell voltage and charging current must be raised to protect the negative electrode from discharging. However, inasmuch as the positive plates are already being over-charged (the positive polarization is typically 120 mV in an AGM cell versus a typical polarization of only about 50 to about 80 mV in a flooded cell), raising the voltage further would reduce the life of the positive grid and undesirably raise cell temperatures.

The cause of the problem with present long life VRLA cells is, therefore, a fundamental one. If the positive grids are made to last a long time by being fabricated from highly corrosion-resistant materials, the cell will not generate sufficient hydrogen ions (plus electrons) to keep the negative electrodes charged and effective. The VRLA cell, therefore, has a self-destructive tendency that is more pronounced as the corrosion-resistance of the positive grid improves.

Figure 5:
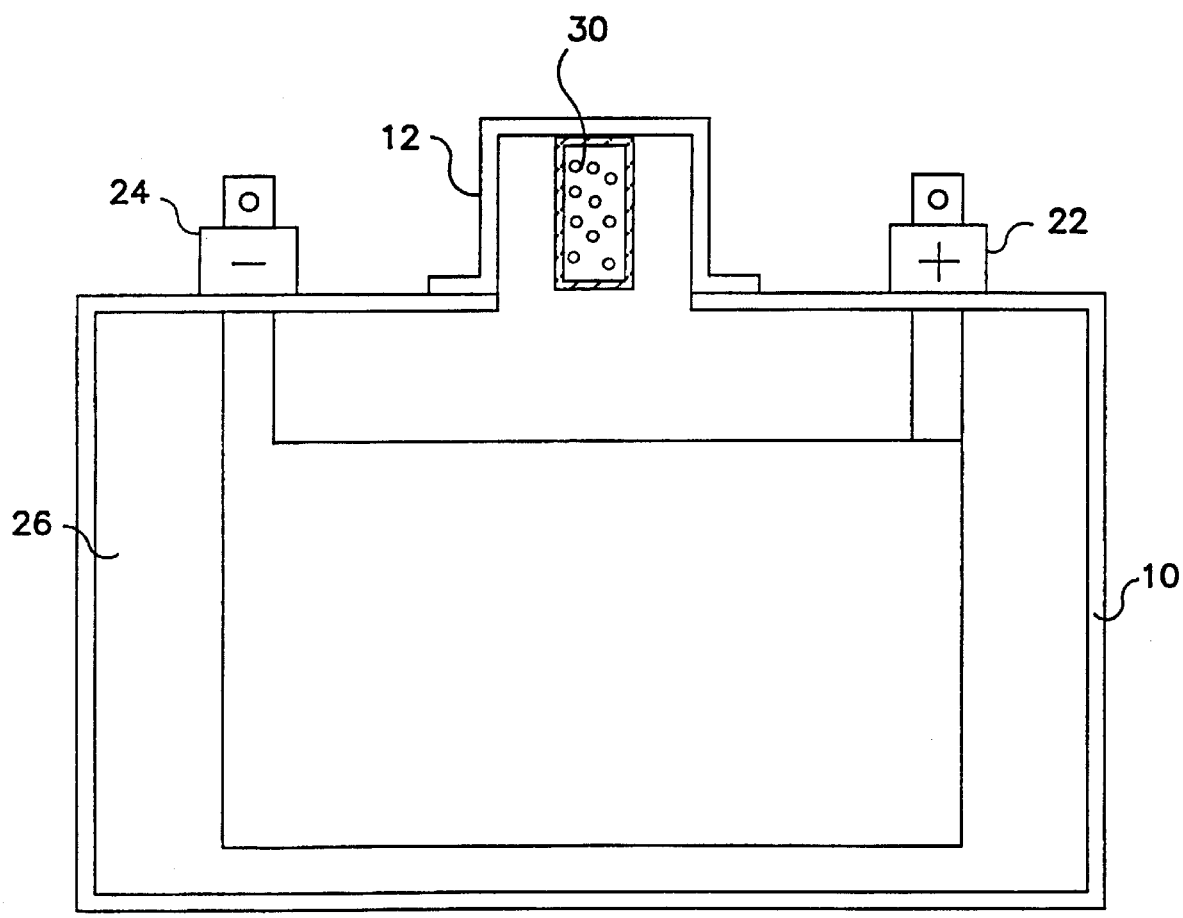
FIG. 5 shows a schematic cross-sectional view of VRLA cell equipped with a catalyst.

To cope with the problem of the intrinsic unbalance of the cell with the resultant discharge of the negative plate, the present invention provides means for coping with "excess" oxygen in the cell, for example, a portion of the oxygen from the oxygen cycle is prevented from reaching the negative plate. With reference to FIG. 5, such means can include a recombination catalyst 30 positioned in the gas space 26 of the VRLA cell in order to remove the "excess" oxygen by recombining it with the hydrogen gas that is always available in VRLA cells of long-life design.

The preferred catalyst material is 0.5% palladium deposited on alumina or carbon. Other catalysts can be used, for example, other available catalysts of the platinum group, tungsten carbide, or even hot wires such as used by Edison in 1913. The catalyst should be positioned in communication with the gas space 26 of a VRLA cell and reliably recombine hydrogen and oxygen gases in the relatively small amounts that are present.

The detail of the design of the catalyst 30 and its location in the cell should take into account factors that are well known in the art. For example, the catalyst 30 should be protected preferably from acid spray from the electrolyte. An advantage of the use of catalysts in VRLA cells is that the density of the acid used in such cells is typically 1.300 instead of the more usual 1.225 density of the acid used in a flooded cell. This makes the atmosphere in the cell dryer and acts to dry out the catalyst if it gets wet with the water that is formed by virtue of the catalyst being present. In short, conventional catalysts will suffice to gain the benefits described here.

It is preferred to position the catalyst in the pressure relief (one-way) valve 12 (see FIG. 5) so that it can be inserted into and removed from the cell easily. In a preferred embodiment, the catalyst is in the form of pellets held in a porous ceramic container.

Alternatively, the catalyst can be positioned in a catalyst housing that is separate from the pressure relief valve.

The embodiment of FIG. 5 shows a single cell positioned in the housing. It should be understood that the gopresent invention contemplates a plurality of cells positioned in the housing.

The use of a catalyst in a VRLA cell in accordance with the present invention is to be distinguished from the use of a catalyst in a conventional flooded cell which is on charge. By way of background, it is noted that, according to Faraday, one ampere hour generates 418 mL of hydrogen and 209 mL of oxygen at standard temperature and pressure (STP). In a flooded cell, especially at high charging rates, most of this gas escapes the cell. However, in order to reduce water consumption, a catalyst can be used to convert the relatively large amount of gas to water by recombining substantially all of the gases. Basically, the catalyst is used in the flooded cell to recombine into water the bulk oxyhydrogen gas created at the electrodes by the charge current.

In practice, this requires large catalytic devices and the generation of a great deal of heat. For example, a large, 600 ampere hour, fork-lift truck cell may be charged at 30 amps. A catalyst recombining the resultant gasses will have to dissipate about 50 watts—the power of an electric light bulb—on each cell.

In contrast to the conventional flooded cell, a VRLA cell is quite different. For example, the VRLA cell is inherently a "recombinant" cell which functions in a manner such as to minimize water loss caused by electrolysis. The oxygen cycle in the VRLA cell is achieved by the cell itself with an efficiency of 95% or more. This means that use of the catalyst in accordance with the present invention recombines a relatively small amount of the $H_2/O_2$ produced in the cell, for example, about 2 to about 8% of the oxygen produced in the cell. Accordingly, the amount of catalyst used in accordance with the present invention is small relative to that needed for a flooded cell and the heat generated at the catalyst much lower. For example, a large, 600 ampere hour, standby VRLA cell may be charged at 0.3 amp or a total of less than 1 watt per cell. Further, about 95% of that power would be absorbed by the oxygen cycle itself leaving only a fraction of the watt of power for the catalyst to dissipate. This is clearly a very different technology than associated with the use of a catalyst in a flooded cell. In short, the primary purpose in using a catalyst in accordance with the present invention is to remove substantially continuously a very small amount of the total oxygen—excess oxygen—from an unbalanced cell design and convert it to water, thereby preventing or deterring discharge of the negative electrode and decreasing the dryout rate of the cell.

The use of a catalyst has also been reported in applications involving VRLA cells in batteries used for operating fork-lift trucks. Such use of the catalyst is like that associated with the aforementioned flooded battery because it involves the recombination of bulk oxyhydrogen gas and the use of different operating parameters than involved in the use of the present invention.

In the fork-lift truck type application, or other deep discharge or "cycling" applications, the battery has to be charged quickly from a state of full discharge so the fork-lift truck can be used in the next shift of work. To charge a battery quickly, the voltage must be raised; this increases the current and overwhelms the cell's natural ability to recombine oxygen gas. As this occurs, the cell begins to electrolyze bulk oxyhydrogen gas just like a flooded cell. In an effort to reduce water consumption, a catalyst could be used to recombine the bulk oxyhydrogen gas, as a catalyst is used in the flooded cell.

Cycling applications of the aforementioned type associated with the charging of a fork-lift truck battery, are clearly distinguishable from the standby (stationary) applications in that the former rely on the use of a relatively high voltage charge. For example, in a cycling or deep discharge application, where a battery is typically charged and discharged every day, charge voltages are usually well above 2.40 volts per cell. Gassing due to electrolysis is high and the use of a catalyst to recombine these gases might, perhaps, be expected. The use of charge voltage as low as 2.35 volts per cell would not be very practical because it would make the recharge time too long.

On the other hand, in a standby application, the standby battery is usually "floated" or charged substantially continuously so the charge voltage is significantly lower than that used in the cycling application. A typical VRLA cell on float charge would be charged at about 2.25 volts per cell. A relatively small amount of gas is generated and the use of a catalyst in such an application would be considered by those skilled in the art as redundant. Floating a VRLA cell continuously at 2.35 volts would reduce its life, but such voltage may be used if the substantially continuous charge involved intermittent short stoppages, for example, pulsating charges.

The examples which follow include descriptions of embodiments of the present invention. Comparative examples are set forth also.

EXAMPLES

The first two examples are illustrative of problems associated with conventional prior art VRLA cells.

Comparative Examples C1 and C2

Two high quality VRLA cells that had been floated (charged) continuously and undisturbed for two years at 80° F. were each given a capacity test. Both failed seriously; one yielded 75% capacity while the other yielded only 60% capacity. Reference electrodes in the cells showed that they failed due to limiting capacity of the negative plates, not the positive plates. The negative plates had discharged in a mere two years of service in cells designed for 20 years of life. Since the test itself had done nothing unusual to the cells that would explain such a continuous discharge, it became clear that there was something fundamentally wrong with the design of the conventional prior art cells.

The next example is illustrative of embodiments of the present invention. Comparative embodiments are described above also.

Example 1

To test the effect of catalysts in long-life VRLA cells, a special test was constructed. Ten cells were installed in a water bath controlled at a constant temperature of 90° F. The cells were charged at various voltages and the gas emitted from each cell was collected in glass containers. Five cells were equipped with catalyst devices in accordance with the present invention (hereafter "the catalyst cells"). The other five cells were left as standard control cells, that is, prior art cells which are hereafter referred to as "the control cells". Reference electrodes were installed into one cell in each set to measure negative plate potentials. The results were impressive. In less than one day, the negative plates on the catalyst cells were polarized. This was evidence that they were not discharging. In contrast, the negative plates on the control cells were at open circuit or a little below, as is typical of such cells, and almost certainly discharging. In addition, it was observed that the charging current dropped on the catalyst cells to less than one-half the value of the control cells. Also gas measurements that were made over many months and at several different charge voltages, showed the gas emissions of the catalyst cells were approximately five times lower than those of the control cells. This implies a five times increase in life to dryout for the catalyst cells. It was observed also that the gas emissions of the control cells were erratic, whereas the gas emissions of the catalyst cells were relatively uniform.

Figure 4:
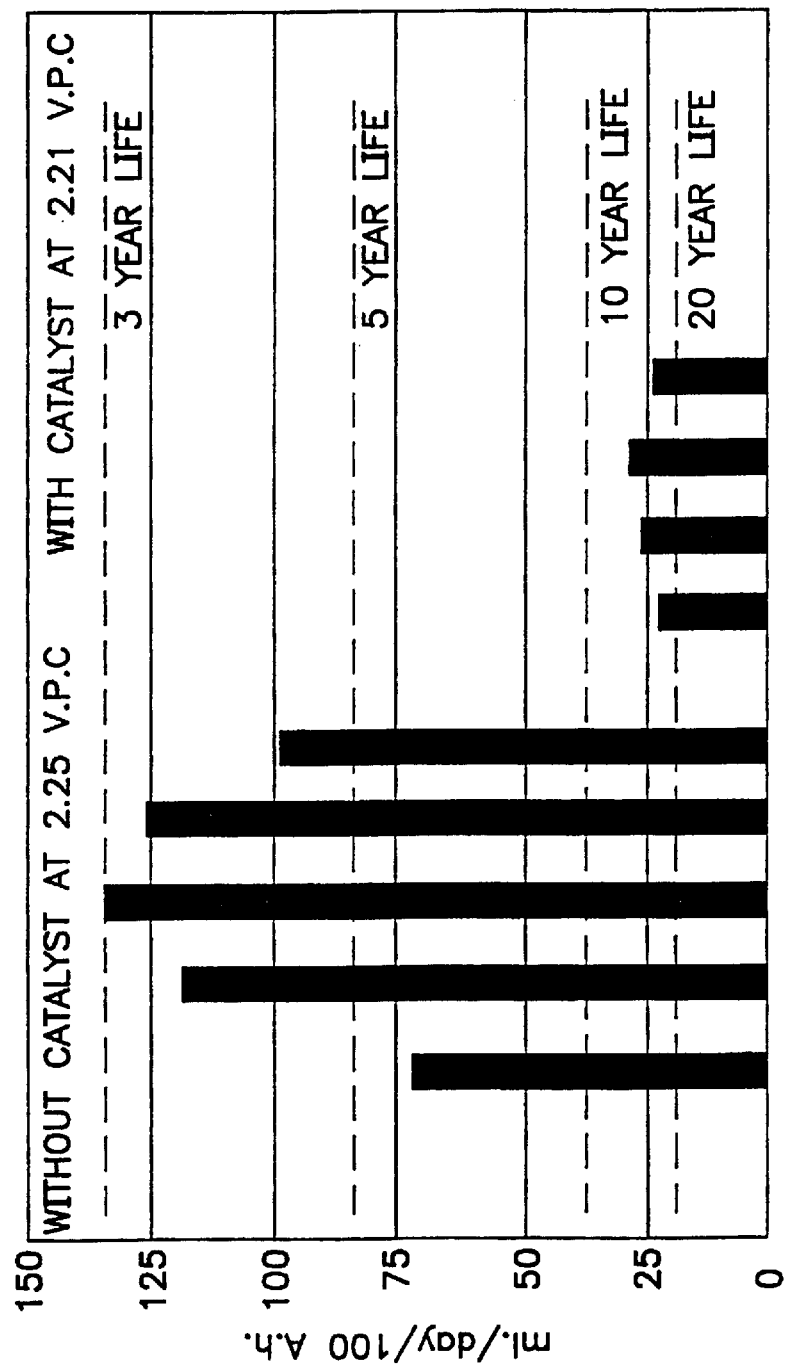
FIG. 4 shows a bar graph depicting the relative gas emissions from conventional VLRA cells and VRLA cells equipped with catalysts.

The gas emission results are shown in graphical form in FIG. 4 for control cells charges at 2.25 v.p.c. and for catalyst cells charged at 2.21 v.p.c. The magnitude of the improvement is difficult to exaggerate. The catalyst cells gassed at rates five times lower than the theoretical minimum possible with the control cell, that is, an unmodified VRLA cell. In view of such results, it is worthy to note that, according to fundamental theoretical constraints, a conventional VRLA cell on charge cannot emit less hydrogen gas than it does on open circuit. (This is widely known as Berndt's Rule). Catalyst cells used in the tests, however, broke through this fundamental barrier and emitted five times less gas than the gas emitted on open circuit. It is believed that the reason for this improvement is that the conventional VRLA cell cannot recombine hydrogen gas while the catalyst cell can.

Such lower level of gassing is defined by another fundamental constraint, that is, the rate of positive grid corrosion. If a catalyst is placed in a conventional unbalanced VRLA cell made with high quality, 20-year life positive grids, it can be expected to last the full twenty years and not be subject to early failure from dryout or negative discharge.

I therefore claim:

1. In a method for charging a valve-regulated, lead-acid (VRLA) cell at a charge voltage which has a value that is slightly in excess of the value of the open-circuit voltage of the cell, said cell including, in spaced relationship, a positive electrode and a negative electrode, and sandwiched therebetween electrolyte-containing separator means in which electrolyte is contained, wherein, during charging of the cell, there is produced at the positive and negative electrodes respectively oxygen gas and hydrogen gas in a predetermined amount, a portion of the oxygen gas tending to migrate through the electrolyte-containing separator means to the negative electrode and cause depolarization thereof, and wherein there is also formed at the positive electrode hydrogen ions which migrate to the negative electrode to form hydrogen gas in an amount less than said predetermined amount, the negative electrode tending to discharge over a prolonged period of time during charging, the improvement comprising inhibiting the tendency of the negative electrode to discharge during charging by controlling the amount of oxygen gas in the cell by catalytically converting a portion of the oxygen gas and a portion of the predetermined amount of hydrogen gas to water.

2. A method according to claim 1 wherein the charge voltage is no greater than about 0.3 volt in excess of the value of the open-circuit voltage in an application in which there is an intermittent flow of current.

3. A method according to claim 1 wherein the charge voltage is no greater than about 0.2 volt in excess of the value of the open-circuit voltage in an application in which the flow of current is uninterrupted.

4. A method according to claim 1 wherein the open-circuit voltage of the cell is about 2.15 volts and the charge voltage is no greater than about 2.35 volts.

5. A method according to claim 1 wherein the open circuit voltage of the cell is about 2.15 volts.

6. A method according to claim 1 wherein the charge voltage is about 2.25 volts.

7. A method according to claim 1 wherein the open-circuit voltage is about 2.15 volts.

8. A method according to claim 1 wherein a major portion of the oxygen gas produced at the positive electrode tends to migrate through the separator means to the negative electrode.

9. An electric cell comprising:

(A) a sealed housing;

(B) a positive electrode positioned in the housing;

(C) a negative electrode positioned in the housing in spaced relationship from the positive electrode;

(D) electrolyte-containing separator means positioned between said electrodes and containing electrolyte;

(E) a pressure relief valve which allows gas to escape from the housing and which prevents oxygen gas from outside the housing to contact said negative electrode;

(F) a catalyst positioned in the housing for converting oxygen gas and hydrogen gas which is generated in the housing to water; and (G) means for charging the cell at a charge voltage having a value which is slightly in excess of the value of the open-circuit voltage of the cell.

10. A cell according to claim 9, wherein the means for charging the cell provides an uninterrupted flow of current.

11. A cell according to claim 9, wherein the means for charging the battery provides an intermittent flow of current.

12. A cell according to claim 9, wherein said catalyst is positioned in said relief valve and is removable from the housing with said valve.

13. A cell according to claim 9, wherein said catalyst is a material which is a metal of the platinum group of metals.

14. A cell according to claim 13 wherein said metal is palladium.

15. A cell according to claim 14, wherein said palladium is supported on alumina or carbon.

16. A cell according to claim 9, wherein said means for charging the cell provides an intermittent flow of current and a charge voltage of no greater then about 0.3 volt in excess of the value of the open-circuit voltage of the cell.

17. A cell according to claim 9, wherein the means for charging the cell provides an uninterrupted flow of current and a charge voltage of no greater than about 0.2 volt in excess of the value of the open-circuit voltages of the cell.

18. A cell according to claim 9, wherein the open circuit voltage of the cell is about 2.15 volts and the charge voltage is no greater than about 2.35 volts.

19. A cell according to claim 9, wherein the separator means include absorbent glass fibers capable of absorbing said electrolyte.

20. A cell according to claim 9 wherein said separator means include said electrolyte in gelled form.

21. In a method for float charging a valve-regulated, lead-acid (VRLA) cell at a charge voltage which has a value that is slightly in excess of the value of the open-circuit voltage of the cell, said cell including, in spaced-apart relation-ship, a positive electrode, a negative electrode, and sandwiched therebetween a separator in which electrolyte is contained, wherein during charging of the cell, there is (1) a self-discharge reaction at the negative electrode, (2) the production at the positive and negative electrodes respectively of oxygen gas and hydrogen gas, with a portion of the oxygen gas migrating through the electrolyte-containing separator to depolarize the negative electrode, and (3) corrosion of the positive electrode to form hydrogen ions which migrate to the negative electrode through said separator to form hydrogen gas by said self-discharge reaction of said negative electrode in an amount less than that needed to counter said negative electrode self-discharge and prevent a loss of capacity over a prolonged period of time during charging, the improvement comprising countering said self-discharge reaction of the negative electrode by catalytically converting a portion of the oxygen gas and a portion of the hydrogen gas to water.

* * * * *